UNITED STATES PATENT OFFICE.

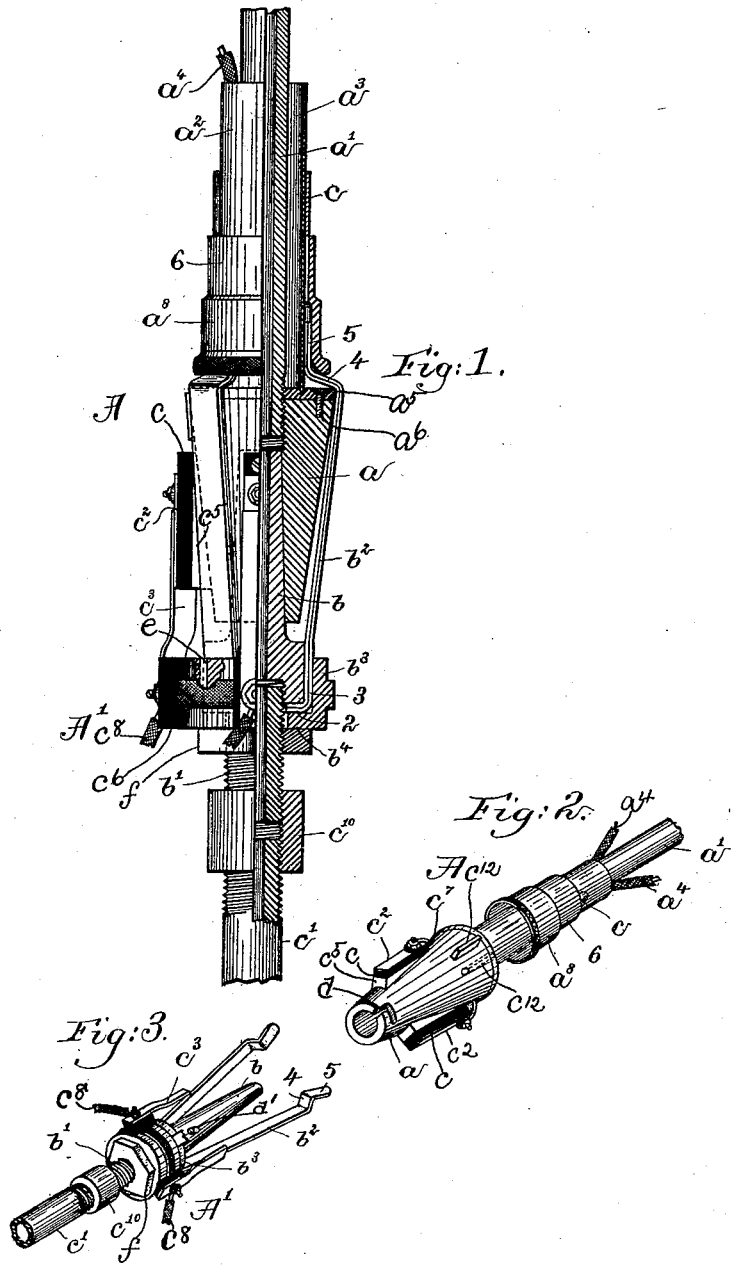

WILLIAM J. KELLY, OF BOSTON, MASSACHUSETTS.

GAS AND ELECTRIC COUPLING.

SPECIFICATION forming part of Letters Patent No. 513,112, dated January 23, 1894.

Application filed September 19, 1893. Serial No. 485,761. (No model.)

*To all whom it may concern:*

Be it known that I, WILLIAM J. KELLY, residing in Boston, in the county of Suffolk and State of Massachusetts, have invented an Improvement in Gas and Electric Couplings, of which the following description, in connection with the accompanying drawings, is a specification, like letters and figures on the drawings representing like parts.

This invention relates to a combination gas and electric joint or coupling, and has for its object to provide a simple and efficient coupling especially designed and adapted to be used as a coupling for chandeliers, wall brackets and other piping used in buildings furnished with gas and electricity, and more particularly theaters.

In accordance with this invention, the coupling or joint is composed of two hollow members constructed to fit together gas tight, and locked by means of a collar or ring on the outside of one member engaging preferably a plurality of spring arms secured to the outside of the other member of the coupling. The members of the coupling are provided with electric contacts or terminals adapted to be brought into engagement with each other when the coupling is connected or in operative condition, as will be described. These and other features of this invention will be pointed out in the claims at the end of this specification.

Figure 1 is a vertical section and elevation of one form of coupling or joint embodying this invention; Fig. 2, a perspective view of one member of the coupling shown in Fig. 1, and Fig. 3, a perspective view partially broken out of the other member of the coupling.

The coupling herein shown as embodying this invention is designed to be used as a chandelier coupling, and is composed of two members each comprising a number of pieces. To facilitate description, the said members may be referred to as A A', the member A being the upper one shown in Fig. 1 and the member A' being the lower one shown in said figure. The member A herein shown is composed of a barrel $a$ preferably conical in shape and provided with a conical hole or bore, into the upper end of which is extended a pipe $a'$, provided with screw threads to engage internal screw threads at the upper end of the barrel $a$, the said pipe in practice being designed to conduct gas or other fluids. The gas pipe $a'$ is surrounded by a shell or tube $a^2$ of sufficient diameter to leave a space $a^3$ between it and the pipe $a'$ for the passage of electric conductors or wires $a^4$, only one of which is shown in Fig. 1 and two in Fig. 2. The shell or tube $a^2$ is made fast to the barrel $a$, which may be effected by means of a ring or washer $a^5$ secured to the top of the said barrel as by screws $a^6$, the said ring or washer being provided on its upper face with an annular channel or groove $a^7$ into which the shell or tube $a^2$ is fitted and soldered therein. The shell or tube $a^2$ has mounted on it a collar $a^8$ for a purpose as will be described.

The co-operating member A' of the coupling is herein shown as composed of a hollow core $b$, conical in shape to fit into the conical bore or hole of the barrel $a$ and provided with a central bore or opening of substantially the same diameter as the pipe $a'$, the said core at one end being shown as provided with an enlarged opening into which is extended a nipple $b'$, screw threaded on its outer side to engage screw threads of the enlarged opening of the said core. The nipple $b'$ is of substantially the same diameter as the bore of the core $b$. The member A' is provided with preferably a plurality of spring arms $b^2$, which may be fastened to the core $b$ as herein shown by a collar $b^3$ adapted to embrace the enlarged portion or base of the core $b$, and provided with an inwardly extended annular flange $b^4$, formed with an opening of sufficient size to permit the collar $b^2$ to be readily slipped over the nipple $b'$. Each spring arm $b^2$ is preferably made as herein shown, it being provided at one end, which I may designate as the lower end, with an inwardly bent portion 2, adapted to be clamped between the bottom of the core $b$ and the annular flange $b^4$ of the collar $b^3$. The spring $b^2$ is also preferably provided with a substantially short straight portion 3 adapted to fit into a longitudinal notch, recess or channel in the outside or periphery of the base portion of the core $b$, and the said spring arm at its upper or opposite end is provided with an inwardly bent portion 4 and a substantially straight or vertical portion 5. The spring arms $b^2$ and the collar $a^8$ co-operate to lock the members A A', when fitted together, as will be described.

The shell $a^2$ is provided with one or more projections, lugs or ribs $c$, which co-operate with longitudinal slots, channels or passageways, not shown, on the inner side of the upper portion 6 of the collar $a^8$, the said lugs or projections being made of such length as will permit the collar $a^8$ to pass by them and be turned so as to bring a solid portion of the collar in line with the lugs or projections $c$, when the said collar is fitted into place as shown in Fig. 1, the lugs or projections $c$ acting to lock the said collar on the spring arms. The nipple $b'$ may be coupled to the pipe $c'$ by a threaded sleeve $c^{10}$.

As thus far described, the coupling may be used to couple the gas pipes $a'$ and $c'$, and to enable the same coupling to be used to connect parts of an electric circuit or circuits, the members A A' are provided with contacts or circuit terminals to which the circuit wires are connected.

The members A A' may be provided with a plurality of co-operating contacts, only two sets being shown in the drawings. Each set of contacts may and preferably will be made as herein shown, it consisting of a contact strip or plate $c^2$ and a contact strip or arm $c^3$. The contact strip or plate $c^2$ in the present instance is shown as secured to an insulating block or support $c^4$, which is shown as mounted on a projection or rib $c^5$ on the barrel $a$, while the co-operating contact arm $c^3$ is secured to an insulating block or support $c^6$ mounted on the collar $b^3$. The contact strip or plate $c^2$ has electrically connected to it one end of the wire $a^4$ which is carried down through the space $a^3$ and through a suitable hole or passage $c^7$ in the barrel $a$ and shown only in Fig. 2, while the contact arm $c^3$ has electrically connected to it one end of the wire $c^8$, which is connected to the wire $a^4$ through the contacts or terminals $c^3$ $c^2$.

In operation, the parts or members A, A', shown separately in Figs. 2 and 3, may be coupled together in the following manner: The core $b$, which is ground gas tight to the barrel $a$, is inserted into the said barrel, and the collar $a^8$ moved into substantially the position shown in Fig. 2, so as to permit the spring arms $b^2$ to be brought together into the position shown in Fig. 1, after which the collar $a^8$ is slipped over the straight portion or ends 5, and partially rotated or turned to remove the slots or channels in its upper part 6 out of line with the lugs or projections $c$, and to bring a solid portion of the said collar into line with the said lugs or projections, which securely locks the members A A' together, and at the same time brings the contacts or circuit terminals carried by the core $b$ into engagement with the contacts or circuit terminals on the barrel $a$, to thus establish the electric circuit or circuits at the coupling and thus place the chandelier or other fixture in condition to be lighted by gas or electricity or both.

The coupling may be disconnected by reversing the operations above described. When the coupling is used on a chandelier or other suspended fixture, the said coupling occupies the position shown in Fig. 1, and the weight of the chandelier or other fixture is mainly supported by the spring arms $b^2$, but if desired a portion of the weight may be taken by the barrel $a$, which may be provided with a bayonet slot $d$ to receive a pin or projection $d'$ on the core $b$, the said bayonet joint acting to temporarily secure the parts together while the collar is being fitted over the spring arms.

To prevent the breaking of the electrical connections while the members A A' are locked together, which might be done by the accidental turning of one of the said members, the barrel $a$ is provided with preferably one or more lugs $c^{12}$ for each spring arm, which co-operate with the said spring arms and prevent rotation of the members A A' and thereby prevent accidental breaking of the electrical connections.

The collar $b^3$ is preferably secured on the core $b$ against rotation by means of a key or spline $e$. In practice, the members of the coupling may be quickly connected and disconnected, which is especially advantageous in theaters where it is required to use chandeliers and like fixtures in some scenes and not in others.

I claim—

1. In a coupling comprising two hollow members, the combination with one or more arms secured to the outside of one member, of a collar or hood carried by and movable on the outside of the other member and engaging the said arms to secure the said hollow members together, and means to lock the said collar and arms together, substantially as described.

2. In a coupling comprising two hollow members, the combination with spring arms carried by one member on its outer side, of a collar or hood encircling the other member and movable longitudinally thereon to engage said spring arms to secure said members together and means to lock said collar and arms together, substantially as described.

3. In a coupling comprising two hollow members provided on their outside with co-operating contacts or circuit terminals, the combination with arms carried by one of the said members on its outer side, of a collar or hood carried by and movable on the other member and engaging the said arms to secure the said members together and thereby establish electrical connection between the contacts on the said members, and means to lock said collar and arms together, substantially as described.

4. In a pipe coupling, the combination with two members comprising hollow connections provided with smooth contacting surfaces to fit together gas tight, of spring arms attached to the outside of one member, and a hood or collar carried by and movable on the outside of the other member and engaging the spring arms to secure the said hollow connections together, and means to lock said movable collar and arms together, substantially as described.

5. In a pipe coupling, the combination with two members comprising hollow metallic connections provided with smooth contacting surfaces to fit each other gas tight, and provided on their outside with contacts electrically separated from the said hollow metallic connections, and means to secure the said hollow connections together, substantially as described.

6. In a pipe coupling, the combination of the following instrumentalities, viz:—a barrel, a pipe secured thereto, a shell encircling said pipe of larger diameter to leave a space $a^3$, a collar on said shell, a circuit terminal or contact on said barrel, a core to enter said barrel, a circuit terminal or contact on said core co-operating with the contact on the said barrel, and spring arms attached to said core and co-operating with said collar to secure the said core and barrel together, substantially as described.

7. In a pipe coupling, the combination of the following instrumentalities, viz:—a barrel, a pipe secured thereto, a shell secured to said barrel and encircling the said pipe, a collar on said shell, a projection on said shell co-operating with said collar, a circuit terminal or contact on said barrel, a core to enter said barrel, a pipe section secured to said core, a circuit terminal or contact on the said core co-operating with the terminal or contact on the said barrel, a collar on the said core, spring arms secured to the core by the collar thereon and co-operating with the collar on the said barrel, substantially as described.

In testimony whereof I have signed my name to this specification in the presence of two subscribing witnesses.

WILLIAM J. KELLY.

Witnesses:
JAS. H. CHURCHILL,
J. MURPHY.